Dec. 1, 1931.                H. F. MORSE                1,834,795
                               HANGER
                        Filed Dec. 11, 1929
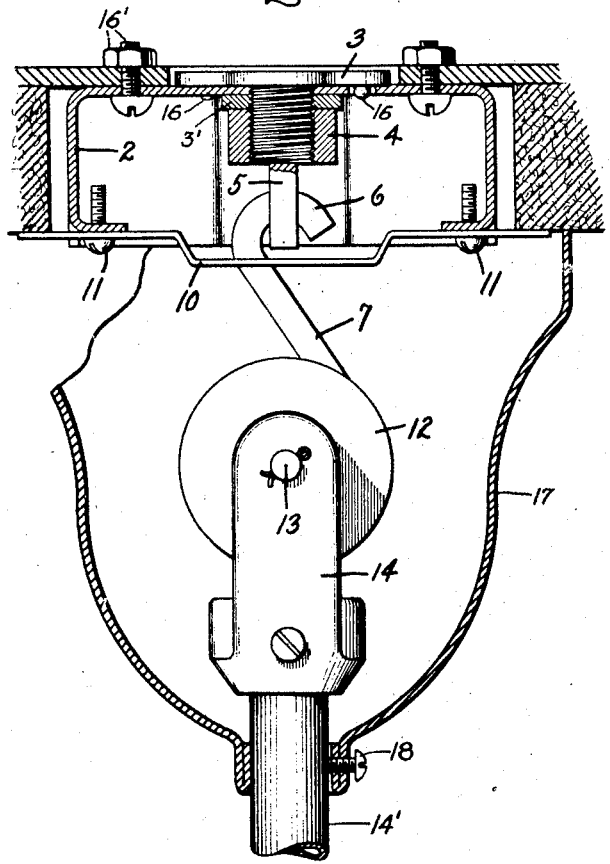
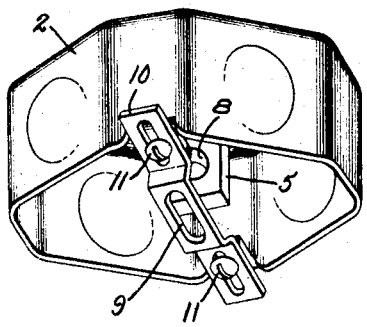
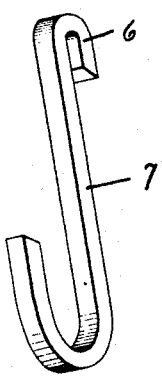
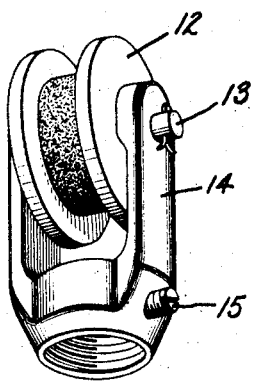
Inventor:
Harold F. Morse,
by Charles E. Tullar
His Attorney.

Patented Dec. 1, 1931

1,834,795

UNITED STATES PATENT OFFICE

HAROLD F. MORSE, OF SOUTHPORT, CONNECTICUT, ASSIGNOR TO GENERAL ELECTRIC COMPANY, A CORPORATION OF NEW YORK

HANGER

Application filed December 11, 1929. Serial No. 413,344.

My invention relates to hangers. More particularly it relates to hangers of a type especially adapted for supporting electric fans and the like from an outlet box in a ceiling, for example.

When a fan is supported from the ceiling the rotation of the fan constantly tends to tighten the parts. For example, there is a constant tendency to tighten the hanger element from a point of support in the outlet box. However, vibration from either the fan or the ceiling may cause the parts to unscrew. It is common practice to use set screws to prevent the elements from unscrewing from one another, but it is quite inconvenient to work with set screws in an outlet box, particularly so in some instances where such boxes are unusually deep. I have, therefore, devised a novel and improved means which is free from such objection and which is more effective and substantial than means heretofore employed.

In the device of the invention there is provided a support in an outlet box that may be radily screwed in place therein and a link through the medium of which a device such as an electric fan may be readily hung in place from said support. There is also provided means to prevent the link from turning as a result of the vibration of the fan. The invention is fully described in the following specification, reference being had to the accompanying drawings, in which Fig. 1 shows in elevation, and partly in section, an outlet box secured to a ceiling, together with a hanger, comprising the features of the invention. Fig. 2 shows in perspective and in so-called exploded view, the elements of the invention illustrating the various details.

Referring more in detail to the drawings, the outlet box 2 may be of any suitable or convenient form, adapted to be secured in any suitable manner to a support such as, for example, the ceiling of a room. In connection with the box I provide a stud 3, the head of which is located behind the box and the threaded portion of which extends through an opening centrally located in the back of the box. This stud is adapted to receive a nut 3' for clamping the stud to the outlet box. To prevent the stud turning it is provided with centering pins 16 which engage suitable corresponding openings in the back wall of the box 2. The lower part of the stud receives a form of wing nut 4, the wing portion 5 of which, in the specific form shown, does not extend beyond the sides of the nut. This wing is provided with an eye 8 to receive the upper terminal 6 of an S-shaped link 7, as shown in Fig. 1. As indicated in the drawings, the link 7 is preferably S-shaped and in cross-section has one dimension greater than another. The upper section of the link is adapted to be inserted through a slot 9 in a cross strip 10, which latter is secured to the marginal section of the box 2 by means of screws 11. In width the slot 9 is less than the greater cross-sectional dimension of the link 7. Therefore the strip 10 serves to prevent the rotation of the link after it is hung from the support 4 in the outlet box. The lower section of the link is adapted to receive a bushing 12, as shown in Fig. 1. This bushing is mounted on a pin 13, to which a bifurcated element 14 is secured. As shown in Fig. 2, the lower portion of the element 14 is threaded and into this threaded portion a stem 14' that supports the frame of the motor may be screwed, as is customary, the set screw 15 serving to lock the stem 14' against rotation with respect to the element 14. After the stud 3 has been secured to the outlet box 4 the latter may be secured to the ceiling as indicated in Fig. 1 by any suitable means, such for example as the screws and nuts 16'. As previously described, the stud 3 is secured to the box by means of the nut 3'. After the box is in position in the ceiling, the wing nut 4 is then secured in place, after which the cross strip 10 is secured to the container as shown in Fig. 2. Thereafter the link 7 is thrust through the opening 9 in the strip 10 and brought into engagement with the wing portion 5 of the nut 4, as shown in Fig. 1. Thereafter the element 14 with the stem 14' is hung on the link 7. All of the foregoing elements being assembled as indicated, the hood 17 is slipped in place as shown in Fig. 1 and secured to the stem 14' by means of the screw 18. After this assembling operation is completed the fan may then be secured to the stem 14' in any suitable manner. Ordinarily the lower end of the stem 14' is threaded and engages a corresponding threaded opening in the frame of the fan for supporting the latter.

The structure of the invention has the advantage that it is simple in design and may be readily assembled or taken down and that the wing nut 4 need not be in locked engagement with the nut 3', thus making it possible to insure that the wing portion of the nut 5 shall be substantially at right angles with the slot 9 in order that the link 7 may be readily hung from the eye 8. The foregoing structure has the additional advantage that the wing nut 4 operates as a guard with respect to the locking nut 3', inasmuch as even if the nut 3' were to become loose as a result of vibration or otherwise the nut 3' could only descend until it strikes the nut 4. In such case, of course, the stud 3 would become somewhat loosened but the pins 16 in the perforations in the outlet box would prevent the stud 3 from turning. Obviously, therefore, the interlocked relation between the stud 3 and the box 2 and the interlocked relation between the link 7, the strip 10, the wing nut 4, and the locking nut 3', insures stability of the structure in a unique manner.

It will be understood that I do not wish to be limited to the structure of the drawings as I contemplate variations and modifications within the spirit of the invention and the scope of the claims contained herein.

What I claim as new and desire to secure by Letters Patent of the United States, is:

1. In combination, a box adapted to be secured to a ceiling, a link, a support for said link located in said box and held thereby for supporting in turn an electric device, a strip extending along a plane transverse said link, a slot in said strip through which the said link extends, said slot and link being non-circular in cross-section along said plane, the width of the slot being smaller than the maximum cross-sectional dimension of the said link whereby said link and its support are prevented from being rotated with respect to the box.

2. In combination, an outlet box adapted to be secured to a ceiling, a link adapted to support an electric device, means secured to said box having a terminal located therein for supporting said link, a strip located across said box and secured against rotation, said strip being provided with a slot through which said link may be inserted and operated to engage the said terminal and through which slot the link may be operated to disengage it from the said terminal, the dimensions of the slot and the link being such that the link is prevented from rotating when in engagement with said terminal.

3. In combination, an outlet box, a supporting link, means for supporting said link in said box, said means comprising a threaded element and a supporting nut in threaded engagement with said element, said link being interlocked with said supporting nut to prevent relative rotation between the supporting nut and the link, means anchored with respect to said link and interlocked therewith for preventing the rotation of the link, a second nut for said supporting means in threaded engagement with the latter, said supporting nut and said second nut being so related that the former operates as a guard against rotation of the latter.

4. In combination, an outlet box, a threaded element supported by the box, means for locking the threaded element against rotation, a nut in said box in threaded engagement with said threaded element, a link adapted for supporting an electric device, said link being supported by and being in interlocked engagement with said nut, and a second nut in threaded engagement with said threaded element between the box and the first nut for maintaining said threaded element and said box in interlocked engagement, said threaded element, first nut, link and second nut being located along a common axis, means for locking said link against rotation about said axis, for locking in turn said first nut against rotation about said axis and for confining the second nut in its position between the box and the first nut.

5. In combination, an outlet box having a threaded fixture stud therein, a nut carried by the fixture stud having a depending portion provided with an opening, a hanger member having an end for engagement in said opening, and a cross strip fastened to the box and extending transversely thereof which engages said hanger member to hold it from rotation.

6. In combination, an outlet box having a threaded fixture stud therein, a nut carried by the fixture stud having a depending portion provided with an opening, a strip extending cross-wise of and fastened to the box, said strip being provided with a slot, and a hanger member having a rectangular end which passes through said slot and engages said opening, said rectangular end engaging the sides of said slot to prevent the hanger member from turning.

In witness whereof, I have hereto set my hand this 9th day of December, 1929.

HAROLD F. MORSE.